US009800943B2

(12) United States Patent
S et al.

(10) Patent No.: US 9,800,943 B2
(45) Date of Patent: *Oct. 24, 2017

(54) SYSTEM AND METHOD FOR MULTIPATH COMMUNICATION MANAGEMENT IN AN AIRCRAFT

(71) Applicant: HCL Technologies Limited, Uttar Pradesh (IN)

(72) Inventors: Jayaramakrishnan S, Karnataka (IN); Sourav Dey, Karnataka (IN)

(73) Assignee: HCL Technologies Limited (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/133,500

(22) Filed: Apr. 20, 2016

(65) Prior Publication Data

US 2016/0360281 A1 Dec. 8, 2016

(30) Foreign Application Priority Data

Jun. 4, 2015 (IN) .......................... 1614/DEL/2015

(51) Int. Cl.
*H04N 21/21* (2011.01)
*H04N 21/63* (2011.01)
(Continued)

(52) U.S. Cl.
CPC ....... *H04N 21/631* (2013.01); *H04N 21/2146* (2013.01); *H04N 21/2385* (2013.01); *H04N 21/41422* (2013.01); *H04W 4/008* (2013.01); *H04W 76/026* (2013.01); *H04N 21/232* (2013.01)

(58) Field of Classification Search
None
See application file for complete search history.

(56) References Cited

U.S. PATENT DOCUMENTS 6,249,913 B1 6/2001 Galipeau et al.
6,934,137 B2 8/2005 Elliott et al.
(Continued)

OTHER PUBLICATIONS

Shahriar Nirjon et al, MultiNets: A System for Real-Time Switching between Multiple Network Interfaces on Mobile Devices, ACM Transactions on Embedded Computing Systems, Mar. 2012, Number of pages—25, vol. 9, No. 4, Article 39, USA.

*Primary Examiner* — Cai Chen
(74) *Attorney, Agent, or Firm* — Hayes Soloway PC

(57) ABSTRACT

Disclosed is a method and seat centric device for providing data over a plurality of communication channels inside an aircraft. In one aspect, the method comprises obtaining storage information of data from one or more aircraft servers and a request for subset of data from a seat centric device. The method further comprises, identifying location of the subset of data in at least one of the one or more aircraft servers based on an analysis of the request the storage information data and an available communication channels between the seat centric device and the aircraft server. Furthermore, the method comprises initializing a multipath protocol for transfer of the subset of data associated with the request between the aircraft server and the seat centric device and initiating data transfer associated with the request simultaneously over the available communication channels for providing the subset of data to seat centric device.

19 Claims, 3 Drawing Sheets

(51) Int. Cl.
    *H04W 4/00*           (2009.01)
    *H04W 76/02*         (2009.01)
    *H04N 21/214*       (2011.01)
    *H04N 21/414*       (2011.01)
    *H04N 21/2385*     (2011.01)
    *H04N 21/232*       (2011.01)

(56) References Cited

U.S. PATENT DOCUMENTS

| | | |
|---|---|---|
| 8,611,317 B2 | 12/2013 | Banerjea et al. |
| 9,307,297 B2 | 4/2016 | Richman et al. |
| 2008/0141315 A1* | 6/2008 | Ogilvie ............... H04N 7/15 725/77 |
| 2013/0074108 A1* | 3/2013 | Cline ............... H04N 21/2146 725/5 |

* cited by examiner

SYSTEM AND METHOD FOR MULTIPATH COMMUNICATION MANAGEMENT IN AN AIRCRAFT

CROSS-REFERENCE TO RELATED APPLICATIONS AND PRIORITY

The present application claims benefit from Indian Complete Patent Application No. 1614/DEL/2015, filed on Jun. 4, 2015, the entirety of which is hereby incorporated by reference.

TECHNICAL FIELD

The present subject matter described herein, in general, relates to a system and a method for providing data over a plurality of communication channels, and more particularly a system and a method for providing data to a seat centric device over a plurality of communication channels inside an aircraft.

BACKGROUND

In modern air transport industry, In-Flight Entertainment systems play a very important role. In-flight entertainment refers to the entertainment available to aircraft passengers during a flight. Furthermore, airlines are continuously working to improve the quality of service. Generally the IFE comprises of a seat back display unit connected to an aircraft server. Generally, the seat back display unit provides option for a passenger travelling in the aircraft to view movies, songs, graphs, flight information, destination information, services, games and like, available in the aircraft server.

Typically, the passengers may also connect their own devices to the existing seat back devices and request for data. Further, such request is forwarded to aircraft severs which provide the requested data. Generally, passenger often experiences connection failure, low band width. This is observed due to problems when transferring data from the aircraft servers to the passenger over a single communication channel such as Wi-Fi. Furthermore, as there is no centralized control of data transfers. Thus, the data transfer and the power consumption are not optimized.

SUMMARY

Before the present seat centric device(s) and methods, are described, it is to be understood that this application is not limited to the particular seat centric device(s), and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application. This summary is provided to introduce aspects related to a seat centric device(s) and a method for providing data to a seat centric device in an aircraft over a plurality of communication channels. This summary is not intended to identify essential features of the claimed subject matter nor is it intended for use in determining or limiting the scope of the claimed subject matter.

In one implementation, a system for providing data to a seat centric device over a plurality of communication channels inside an aircraft. The system comprising a memory and a processor. The processor is capable of executing instructions to perform steps of obtaining storage information of data from one or more aircraft servers, wherein the storage information indicates locations of data stored in the one or more aircraft servers and obtaining a request for subset of data from a seat centric device, wherein the request is received via at least one of a plurality of seat centric device communication channels. Upon obtaining, identifying location of the subset of data in at least one of the one or more aircraft servers based on an analysis of the request the storage information data and identifying available communication channels between the seat centric device and the aircraft server, wherein the available communication channels are identified based on a mapping of the plurality of seat centric device communication channels and a plurality of aircraft server communication channels. Further to identifying, initializing a multipath protocol for transfer of the subset of data associated with the request between the aircraft server and the seat centric device. Subsequently, initiating data transfer associated with the request simultaneously over the available communication channels for providing the subset of data to seat centric device.

In another implementation, a method for providing data to a seat centric device in an aircraft over a plurality of communication channels is disclosed. In one aspect, the method may comprise obtaining storage information of data from one or more aircraft servers, wherein the storage information indicates locations of data stored in the one or more aircraft servers and obtaining a request for subset of data from a seat centric device, wherein the request is received via at least one of a plurality of seat centric device communication channels. Upon obtaining, the method may comprise identifying location of the subset of data in at least one of the one or more aircraft servers based on an analysis of the request the storage information data and identifying available communication channels between the seat centric device and the aircraft server, wherein the available communication channels are identified based on a mapping of the plurality of seat centric device communication channels and a plurality of aircraft server communication channels. Further to identifying, the method may comprise initializing a multipath protocol for transfer of the subset of data associated with the request between the aircraft server and the seat centric device. Subsequently, the method may comprise initiating data transfer associated with the request simultaneously over the available communication channels for providing the subset of data to seat centric device.

In yet another implementation, non-transitory computer readable medium embodying a program executable in a computing device for providing data over a plurality of communication channels inside an aircraft is disclosed. The program may comprise a program code for obtaining storage information of data from one or more aircraft servers, wherein the storage information indicates locations of data stored in the one or more aircraft servers and obtaining a request for subset of data from a seat centric device, wherein the request is received via at least one of a plurality of seat centric device communication channels. Upon obtaining, the program may comprise a program code for identifying location of the subset of data in at least one of the one or more aircraft servers based on an analysis of the request the storage information data and identifying available communication channels between the seat centric device and the aircraft server, wherein the available communication channels are identified based on a mapping of the plurality of seat centric device communication channels and a plurality of aircraft server communication channels. Further to identifying, the program may comprise a program code for initializing a multipath protocol for transfer of the subset of data associated with the request between the aircraft server and the seat centric device. Subsequently, the program may comprise a program code for initiating data transfer associated with the request simultaneously over the available communication channels for providing the subset of data to seat centric device

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and seat centric device disclosed in the document and the figures.

The present subject matter is described detail with reference to the accompanying figures. In the figures, the leftmost digit(s) of a reference number identifies the figure in which the reference number first appears. The same numbers are used throughout the drawings to refer various features of the present subject matter.

DETAILED DESCRIPTION

Figure 1:
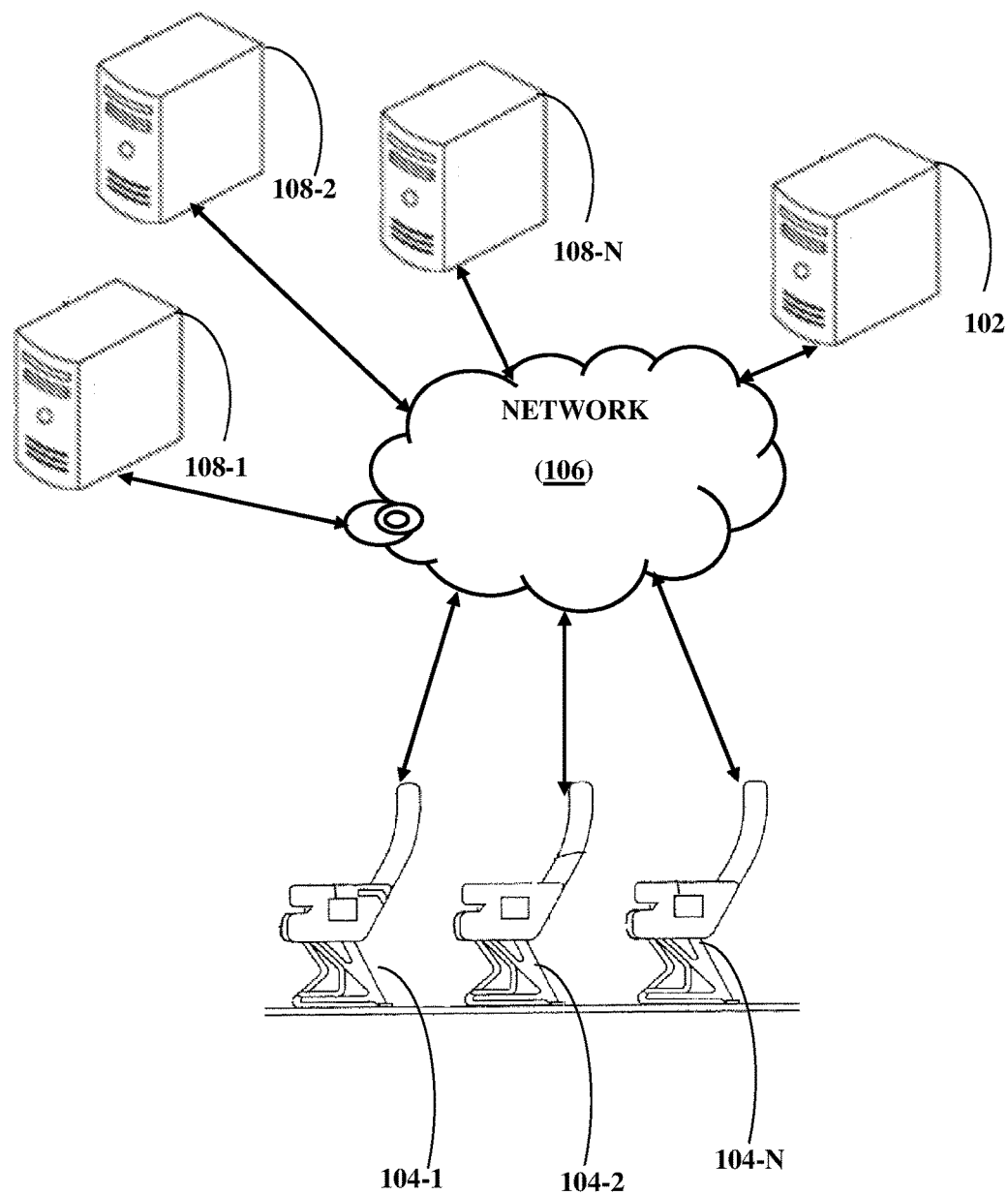
FIG. 1 (illustrates a network implementation of a multipath control and management system for providing data to a seat centric device over a plurality of communication channels in an aircraft, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, systems and methods are now described. The disclosed embodiments are merely examples of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

In an implementation, a multipath control and management system and method for providing data to a seat centric device in an aircraft over a plurality of communication channels, is described. In one example, a request from a user device may be obtained by a seat centric device. In one example, the request may comprise a request for a video, a song, a movie, a webpage, a game and the like. The request may be obtained via a user device communication channels. In an example, the user device communication channels may be one or more of Wi-Fi, 3G, 4G, and GPRS etc.

In the implementation, storage information of entertainment data, aircraft server communication channels data, server operating system data, and server multiprotocol data may be obtained from one or more aircraft servers. The storage information indicates locations of data stored in the one or more aircraft servers. The data may be video files, audio file, game files, e-book files and other files. Upon obtaining the storage information, a request for subset of the data is obtained, from the seat centric device. The request is obtained via at least one of a plurality of seat centric device communication channels. In one example, the multipath control and management system may obtain both the storage information and the requested Further, to obtaining the request, location of the subset of the data associated with the request in at least one of the one or more aircraft servers may be identified. The location of the subset of the data may be identified based on an analysis of the request the storage information data. Subsequent to identification of the subset of the data, an available communication channels between the seat centric device and the aircraft server is identified. The available communication channels identified based on a mapping of the plurality of seat centric device communication channels and a plurality of aircraft server communication channels.

Upon, identification a multipath protocol for transfer of the subset of the data associated with the request is initialized between the aircraft server and the seat centric device. In one implementation the multipath protocol comprises dividing the subset of data into a plurality of small data packets based on predefined division criteria and providing the plurality of small data packets to the available communication channels based on predefined distribution criteria. Subsequent to initialization of data transfer, data transfer associated with the request is initiated. The data transfer may be done simultaneously over the available communication channels for providing the subset of data to seat centric device. Further, monitoring the aircraft server, the seat centric device and the data transfer between the aircraft server and the seat centric device based on a time bound request and an acknowledgement signal. Furthermore, maintaining static address for the available communication channels. Thus enabling fast data transfer and power optimization.

Referring now to FIG. 1, a network implementation of a multipath control and management system 102, herein after referred to as system 102 for providing data over a plurality of communication channels to a user device 108 inside an aircraft, in accordance with an embodiment of the present subject matter may be described. In one embodiment, the present subject matter is explained considering that the system 102 may be implemented as a standalone system 102 connected to aircraft servers 108-1, 108-2, . . . 108-N and the seat centric device 104-1, 104-2, . . . 104-N via network 106.

In another embodiment, the seat centric device 104 may be implemented inside a passenger seat of the aircraft. It will also be understood that the seat centric device 104 may be accessed by multiple users through one or more user devices. Examples of the user devices may include, but are not limited to, a portable computer, a personal digital assistant, a handheld device, and a workstation. The user devices are communicatively coupled to the seat centric device through one or more communication channels.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
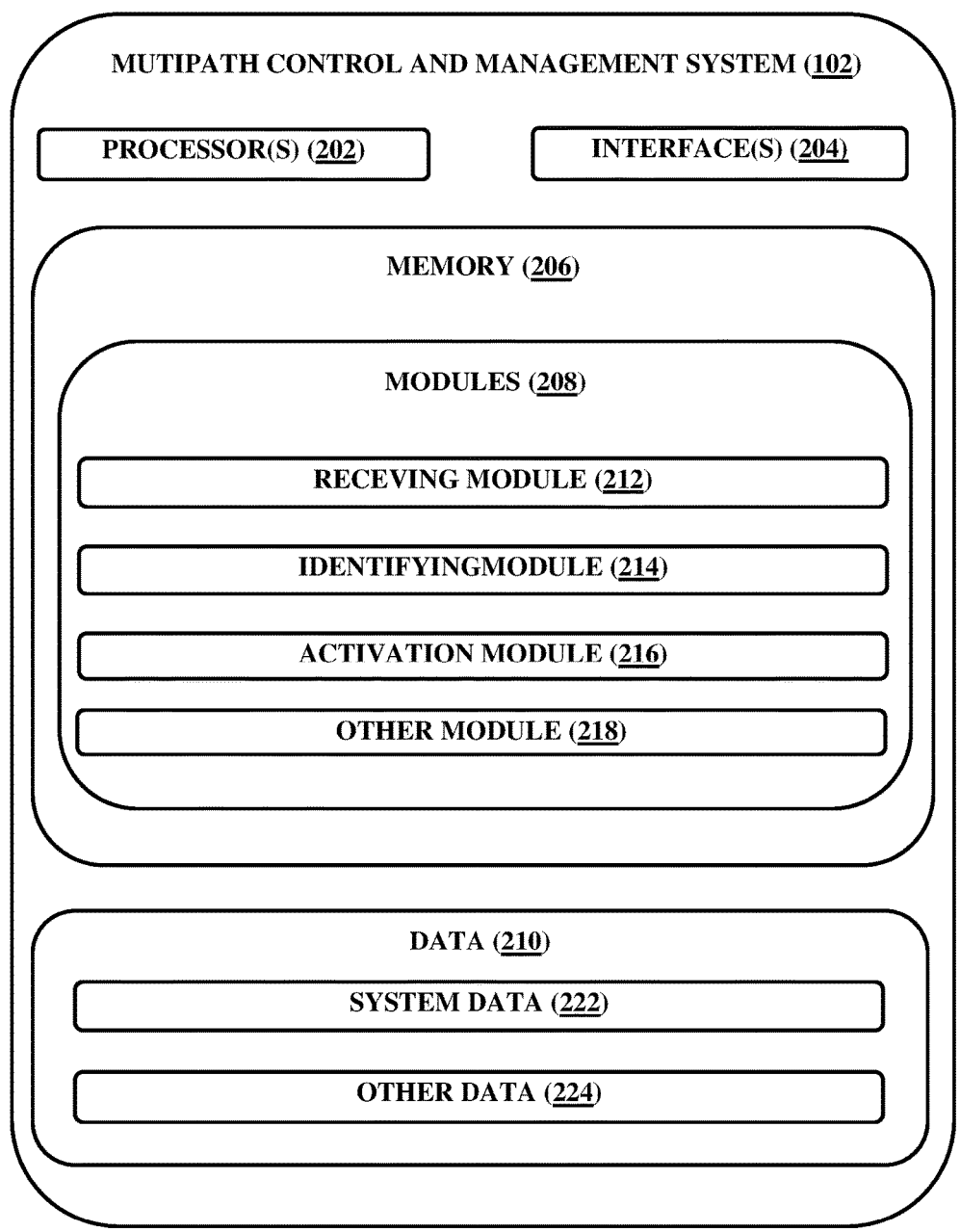
FIG. 2 illustrates the multipath control and management system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, an identifying module 214, an activation module 216 and an other module 218. The other modules 218 may include programs or coded instructions that supplement applications and functions of the system 102. The modules 208 described herein may be implemented as software modules that may be executed in the cloud-based computing environment of the system 102.

The memory 206, amongst other things, serves as a repository for storing data processed, received, and generated by one or more of the modules 208. The memory 206 may include data generated as a result of the execution of one or more modules in the other module 220. In one implementation, the memory may include data 210. Further, the data 210 may include a seat centric device data 222 for storing data processed, received, and generated by one or more of the modules 208. Furthermore, the data 210 may include other data 224 for storing data generated as a result of the execution of one or more modules in the other module 220.

Construe an example, where a user is seated in a passenger seat of an aircraft. In course of his travel, the user wishes to watch a movie on his device. In this example, the device may be a laptop. In the said example, the user may request the seat centric device 104 for the song. In the implementation, at first, a user may use the user device connect to the seat centric device to request for the song. In one example more than one user may simultaneously connect with a seat centric device and request various entrainment data. In the example, the requests may be further forwarded to the system 102 by the seat centric device for obtaining the requested entrainment data.

Receiving Module 212

Referring to FIG. 2, in an implementation, a system and method for providing data to a seat centric device over a plurality of communication channels in an aircraft, is described. In the implementation, the receiving module 212 may obtain storage information of data from one or more aircraft servers. The storage information may comprise information on the locations of data and the aircraft servers in which it is stored. Further, the receiving module 212 may obtain aircraft server communication channels data, server operating system data, and server multiprotocol data. In an example the data may be entertainment data such as video file, audio file, game files, e-books, and the like. Furthermore, the receiving module 212 may obtain a request for subset of the data from a seat centric device. The request may be received via at least one of a plurality of seat centric device communication channels. In one example, the plurality of seat centric device communication channels may comprise at least two of Wi-Fi, Bluetooth, EDGE, 2G, 3G, 4G, 5G, USB cable, wired connection and mobile network. In the implementation, upon receiving, the receiving module 212 may store the received information and request in system data 222. In the example of the user requesting for a song, the request for the song is obtained from the seat centric device Identification Module 214

In the embodiment, subsequent to receiving and storing the received information, the identification module 214 may obtain the storage information. Further, the identification module 214 may identify the location of the subset of data associated with the request. In one example the aircraft server in the subset of data is stored, may be identified. The identification may be based on an analysis of the request and the storage information data.

Upon identification of the location, the identification module 214 may identify an available communication channels between the seat centric device and the aircraft server. The available communication channels are identified based on a mapping of the plurality of seat centric device communication channels and a plurality of aircraft server communication channels. In one example, the available communication channels comprise at least two of Wi-Fi, Bluetooth, EDGE, 2G, 3G, 4G, 5G, USB cable, wired connection and mobile network. IN the example, the plurality of aircraft server communication channels comprise at least two of Wi-Fi, Bluetooth, EDGE, 2G, 3G, 4G, 5G, USB cable, wired connection and mobile network.

In the example of the user requesting for a song, the location of the song is identified. The location may be aircraft server 1. Upon the identification, the available communication channels between the seat centric device and the aircraft server 1 are identified based on a mapping.

Activation Module 216

In the implementation, subsequent to identification, the activation module 216 may initialize a multipath protocol for transfer of the subset of data associated with the request between the aircraft server and the seat centric device. Further to initialization of multipath protocol, the subset of data may be divided into a plurality of small data packets based on a predefined division criteria. In one example, the division may be performed at the transport layer. Further, the plurality of small data packets may be provided to the available communication channels based on predefined distribution criteria. In one example, the multipath protocol may be a Multipath Transmission Control Protocol or a Stream Control Transmission Protocol.

Further, the activation module 216 may initiate data transfer for the plurality of small data packets associated with the request simultaneously over the available communication channels for providing the subset of data to seat centric device.

In the example of the user requesting for a song, the multipath protocol is initialized. Upon initializing the multipath protocol, the data transfer of the requested song from the aircraft server 1 is initiated simultaneously over the available communication system.

The activation module 216 may further monitor the health of the aircraft server, the seat centric device and the data transfer between the aircraft server and the seat centric device based on a time bound request and an acknowledgement signal for effective control and management. The activation module 216 may also maintain static address for the available communication channels. Thus the system and method for providing data to seat centric device over a plurality of communication channels in an aircraft enable increasing the speed of data transfer and reduction in power consumption, and connection failures.

Exemplary embodiments discussed above may provide certain advantages. Though not required to practice aspects of the disclosure, these advantages may include those provided by the following features.

Some embodiments enable the system and the method to monitor the power consumption.

Some embodiments enable the system and the method to increase the bandwidth of data transfer.

Some embodiments enable the system and the method to optimize power consumption.

Some embodiments enable the system and the method to increase the bandwidth during data transmission.

Some embodiments enable the system and the method to increase the speed of data transmission.

Some embodiments enable the system and the method to manage the communication channels.

Figure 3:
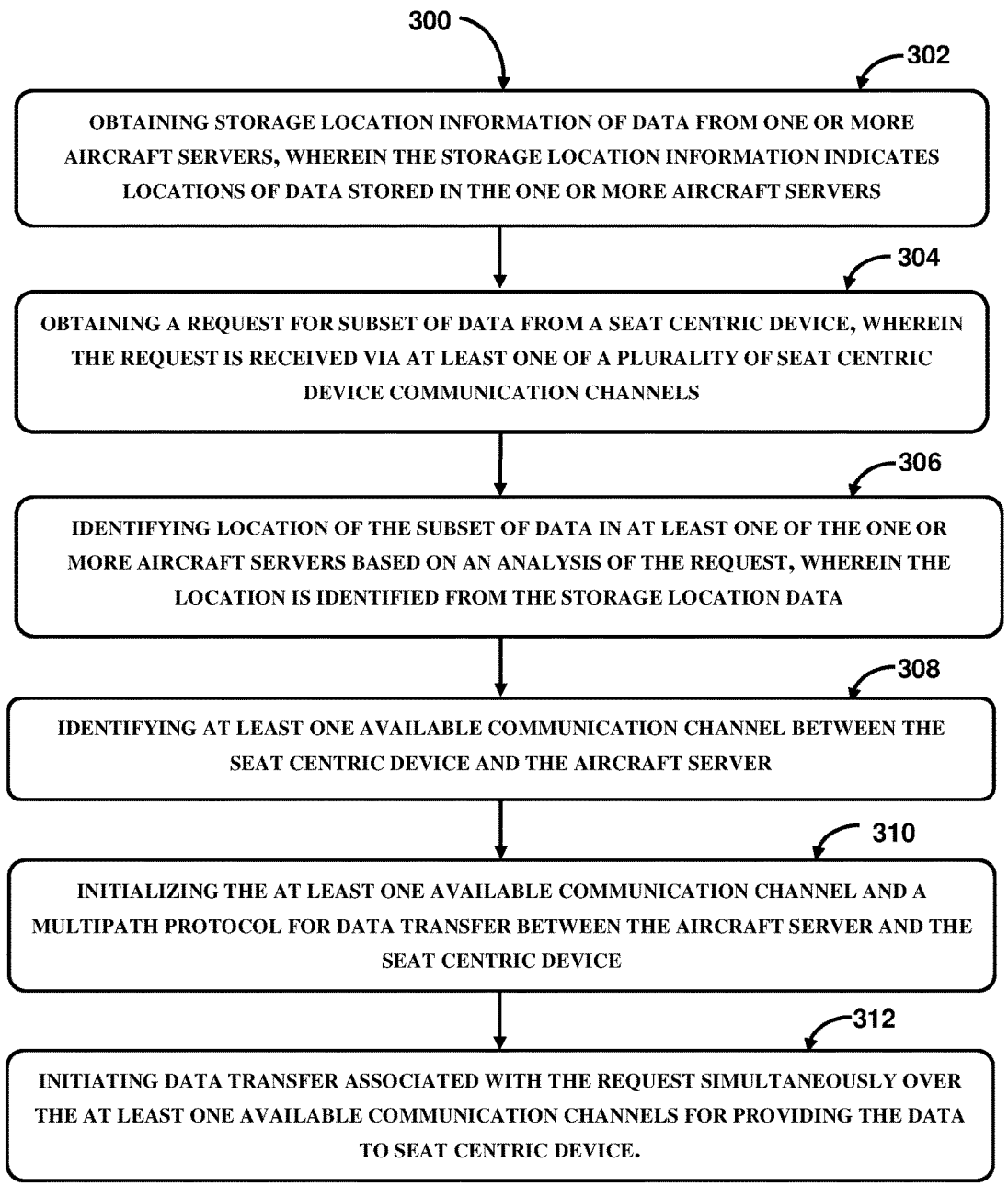
FIG. 3 illustrates a method for providing data to a seat centric device over a plurality of communication channels in an aircraft, in accordance with an embodiment of the present subject matter.

Referring now to FIG. 3, a method 300 for providing data to a seat centric device over a plurality of communication channels in an aircraft is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, storage information of data is obtained from one or more aircraft servers. The storage information indicates locations of data stored in the one or more aircraft servers. In an implementation, the receiving module 212 may obtain storage information of data from one or more aircraft servers and store storage information from a user device in system data 222.

At block 304, a request for subset of data is obtained from a seat centric device. The request is received via at least one of a plurality of seat centric device communication channels. In the implementation, the receiving module 212 may obtain a request for subset of data from a seat centric device and store request in system data 222.

At block 306, location of the subset of data is identified from at least one of the one or more aircraft server(s) based on an analysis of the request. In the implementation, the identifying module 214 may identify location of the subset of data from at least one of the one or more aircraft servers based on an analysis of the request and store the location in the system data 222.

At block 308, an available communication channels between the seat centric device and the aircraft server is identified. The available communication channels are identified based on a mapping of the plurality of seat centric device communication channels and a plurality of aircraft server communication channels. In the implementation, the mapping module 216 may identify at least one active communication channels between the seat centric device and the user device and store the mapping data in system data 222.

At block 310, a multipath protocol for transfer of the subset of data associated with the request between the aircraft server and the seat centric device is initialized. In the implementation, the activation module 216 may initialize a multipath protocol for transfer of the subset of data.

At block 312, data transfer associated with the request is initiated simultaneously over the available communication channels for providing the subset of data to seat centric device. In the implementation, the activation module 216 may initiate data transfer associated with the request simultaneously over the available communication channels and also store the data in system data 222.

Exemplary embodiments discussed above may provide certain advantages. Though not required to practice aspects of the disclosure, these advantages may include a method for providing data over a plurality of communication channels in an aircraft.

Although implementations for methods and systems for providing data to a seat centric device in an aircraft over a plurality of communication channels have been described in language specific to structural features and/or methods, it is to be understood that the appended claims are not necessarily limited to the specific features or methods described. Rather, the specific features and methods are disclosed as examples of implementations of providing data to a seat centric device in an aircraft over a plurality of communication channels.

We claim:

1. A method for providing data to a seat centric device in an aircraft over a plurality of communication channels, the method comprising:
    obtaining, by a processor, storage information of data from one or more aircraft servers, wherein the storage information indicates locations of data stored in the one or more aircraft servers;
    obtaining, by the processor, a request for a subset of data from a seat centric device, wherein the request is received via at least one of a plurality of seat centric device communication channels;
    identifying, by the processor, location of the subset of data in at least one of the one or more aircraft servers based on an analysis of the request and the storage information;
    identifying, by the processor, an available communication channel channels between the seat centric device and the aircraft server, wherein the available communication channels are identified based on a mapping of the plurality of seat centric device communication channels and a plurality of aircraft server communication channels;
    initializing, by the processor, a multipath protocol for transfer of the subset of data associated with the request between the aircraft server and the seat centric device; and
    initiating, by the processor, the transfer associated with the request simultaneously over the available communication channels for providing the subset of data to the seat centric device.

2. The method of claim 1 further comprises obtaining aircraft server communication channels data, server operating system data, and server multiprotocol data.

3. The method of claim 1 further comprise monitoring health pertaining to each of the aircraft server, the seat centric device and the data transfer between the aircraft server and the seat centric device, wherein the health is monitored based on a time bound request and an acknowledgement signal.

4. The method of claim 1 further comprises maintaining static address for the communication channels.

5. The method of claim 1, wherein the multipath protocol further comprises
    dividing the subset of data into a plurality of small data packets based on a predefined division criteria; and
    providing the plurality of small data packets simultaneously to the seat centric device via the available communication channels based on a predefined distribution criteria.

6. The method of claim 1, wherein the multipath protocol is one of a MPTCP (Multipath Transmission Control Protocol) and a Stream Control Transmission Protocol.

7. The method of claim 1, wherein the plurality of seat centric device communication channels comprises at least two of Wi-Fi, Bluetooth, EDGE, 2G, 3G, 4G, 5G, USB cable, wired connection and mobile network.

8. The method of claim 1, wherein the plurality of aircraft server communication channels comprises at least two of Wi-Fi, Bluetooth, EDGE, 2G, 3G, 4G, 5G, USB cable, wired connection and mobile network.

9. The method of claim 1, wherein the available communication channels comprise at least two of Wi-Fi, Bluetooth, EDGE, 2G, 3G, 4G, 5G, USB cable, wired connection and mobile network.

10. A system for providing data to a seat centric device in an aircraft over a plurality of communication channels, the seat centric device comprising:
    a memory; and
    a processor coupled to the memory, wherein the processor is capable of executing instructions to perform steps of:
        obtaining storage information of data from one or more aircraft servers, wherein the storage information indicates locations of data stored in the one or more aircraft servers;
        obtaining a request for a subset of data from a seat centric device, wherein the request is received via at least one of a plurality of seat centric device communication channels;
        identifying location of the subset of data in at least one of the one or more aircraft servers based on an analysis of the request and the storage information;
        identifying an available communication channel channels between the seat centric device and the aircraft server, wherein the available communication channels are identified based on a mapping of the plurality of seat centric device communication channels and a plurality of aircraft server communication channels;
        initializing a multipath protocol for transfer of the subset of data associated with the request between the aircraft server and the seat centric device; and
        initiating the transfer associated with the request simultaneously over the available communication channels for providing the subset of data to the seat centric device.

11. The system of claim 10 further comprises obtaining aircraft server communication channels data, server operating system data, and server multiprotocol data.

12. The system of claim 10 further comprise monitoring health pertaining to each of the aircraft server, the seat centric device and the data transfer between the aircraft server and the seat centric device, wherein the health is monitored based on a time bound request and an acknowledgement signal.

13. The system of claim 10 further comprises maintaining static address for the communication channels.

14. The system of claim 10, wherein the multipath protocol further comprises
    dividing the subset of data into a plurality of small data packets based on a predefined division criterion; and
    providing the plurality of small data packets to the available communication channels based on a predefined distribution criteria.

15. The system of claim 10, wherein the multipath protocol is one of a MPTCP (Multipath Transmission Control Protocol) and a Stream Control Transmission Protocol.

16. The system of claim 10, wherein the plurality of seat centric device communication channels comprises at least two of Wi-Fi, Bluetooth, EDGE, 2G, 3G, 4G, 5G, USB cable, wired connection and mobile network.

17. The system of claim 10, wherein the plurality of aircraft server communication channels comprises at least two of Wi-Fi, Bluetooth, EDGE, 2G, 3G, 4G, 5G, USB cable, wired connection and mobile network.

18. The system of claim 10, wherein the available communication channels comprise at least two of Wi-Fi, Bluetooth, EDGE, 2G, 3G, 4G, 5G, USB cable, wired connection and mobile network.

19. A non-transitory computer program product having embodied thereon a computer program for providing data over a plurality of communication channels inside an aircraft, the computer program product storing instructions, the instructions comprising instructions for:
- obtaining storage information of data from one or more aircraft servers, wherein the storage information indicates locations of data stored in the one or more aircraft servers;
- obtaining a request for a subset of data from a seat centric device, wherein the request is received via at least one of a plurality of seat centric device communication channels;
- identifying location of the subset of data in at least one of the one or more aircraft servers based on an analysis of the request and the storage information;
- identifying an available communication channel between the seat centric device and the aircraft server, wherein the available communication channels are identified based on a mapping of the plurality of seat centric device communication channels and a plurality of aircraft server communication channels;
- initializing a multipath protocol for transfer of the subset of data associated with the request between the aircraft server and the seat centric device; and
- initiating the transfer associated with the request simultaneously over the available communication channels for providing the subset of data to the seat centric device.

* * * * *